United States Patent
Peters et al.

(10) Patent No.: US 10,338,198 B2
(45) Date of Patent: *Jul. 2, 2019

(54) SENSOR APPARATUS

(71) Applicant: Ford Global Technologies, LLC, Dearborn, MI (US)

(72) Inventors: Cindy Anne Peters, Canton, MI (US); Mark Edward Nichols, Saline, MI (US); Sabrina Louise Peczonczyk, Ann Arbor, MI (US); Kerrie Nikaido Holguin, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,432

(22) Filed: Apr. 3, 2017

(65) Prior Publication Data
US 2018/0284232 A1    Oct. 4, 2018

(51) Int. Cl.
| G01S 7/481 | (2006.01) |
| G01S 17/10 | (2006.01) |
| B62D 25/04 | (2006.01) |
| G01S 17/93 | (2006.01) |
| G01S 13/93 | (2006.01) |

(52) U.S. Cl.
CPC .......... *G01S 7/4813* (2013.01); *G01S 17/936* (2013.01); *B62D 25/04* (2013.01); *G01S 17/10* (2013.01); *G01S 2013/9385* (2013.01)

(58) Field of Classification Search
CPC ....... B62D 25/04; G01S 7/4813; G01S 17/10; G01S 17/936; G01S 2013/9385
USPC .................................................. 296/193.06
See application file for complete search history.

(56) References Cited

U.S. PATENT DOCUMENTS

| 4,716,601 | A | 1/1988 | McNeal |
| 7,084,744 | B2 | 8/2006 | Li |
| 8,899,761 | B2 * | 12/2014 | Tonar .................. H01L 41/0973 359/511 |
| 9,400,327 | B2 | 7/2016 | Kupfernagel |
| 2015/0041510 | A1 * | 2/2015 | Frenzel .................. B60R 11/04 224/482 |
| 2015/0241761 | A1 | 8/2015 | Llewellyn |
| 2016/0047901 | A1 | 2/2016 | Pacala et al. |
| 2016/0223663 | A1 * | 8/2016 | Schmalenberg ...... G01S 13/865 |

(Continued)

FOREIGN PATENT DOCUMENTS

| CN | 102632844 B | 3/2014 |
| DE | 20221683 U1 | 1/2007 |

(Continued)

OTHER PUBLICATIONS

GB Search Report dated Sep. 14, 2018 re GB Appl. 1805335.5.
(Continued)

*Primary Examiner* — Joseph D. Pape
*Assistant Examiner* — Dana D Ivey
(74) *Attorney, Agent, or Firm* — Frank A. MacKenzie; Bejin Bieneman PLC

(57) ABSTRACT

A sensor apparatus includes a housing, a LIDAR sensor attached to the housing, and a window releasably coupled to the housing. The window may be cylindrical. The housing may be a first housing, and the sensor apparatus may include a second housing. The window may be releasably coupled to the second housing.

20 Claims, 4 Drawing Sheets

(56) References Cited

U.S. PATENT DOCUMENTS

2016/0282468 A1* 9/2016 Gruver .................... G01S 17/93
2017/0147986 A1    5/2017 Huo et al.
2018/0217242 A1    8/2018 Lombrozo et al.

FOREIGN PATENT DOCUMENTS

| DE | 102006008718 A1 | 8/2007 |
| DE | 102009042285 A1 | 3/2011 |
| EP | 2575000 A2 | 4/2013 |
| WO | 2010024683 A1 | 3/2010 |
| WO | 2014148915 A1 | 9/2014 |
| WO | 2016058039 A1 | 4/2016 |

OTHER PUBLICATIONS

GB Search Report dated Sep. 18, 2018 re GB Appl. No. 1805315.7.
Non-Final Office Action dated Mar. 2, 2019, U.S. Appl. No. 15/477,511, filed Apr. 3, 2017.

* cited by examiner

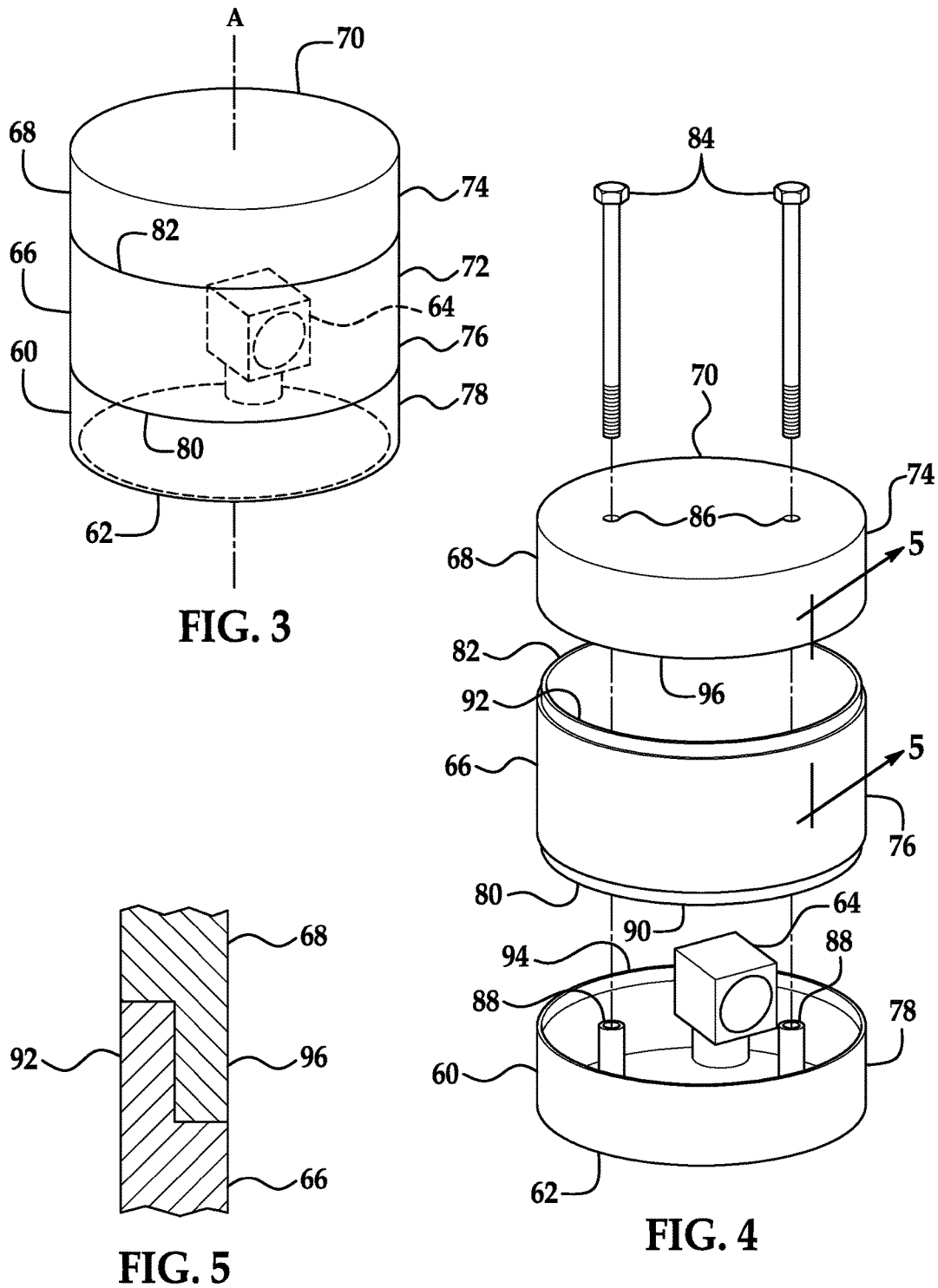

SENSOR APPARATUS

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

BRIEF DESCRIPTION OF THE DRAWINGS

FIG. 3 is a perspective view of a sensor apparatus of the vehicle.

FIG. 4 is an exploded view of a first example of the sensor apparatus.

FIG. 5 is a cross-sectional view of a portion of the first example of the sensor apparatus.

DETAILED DESCRIPTION

Figure 1:
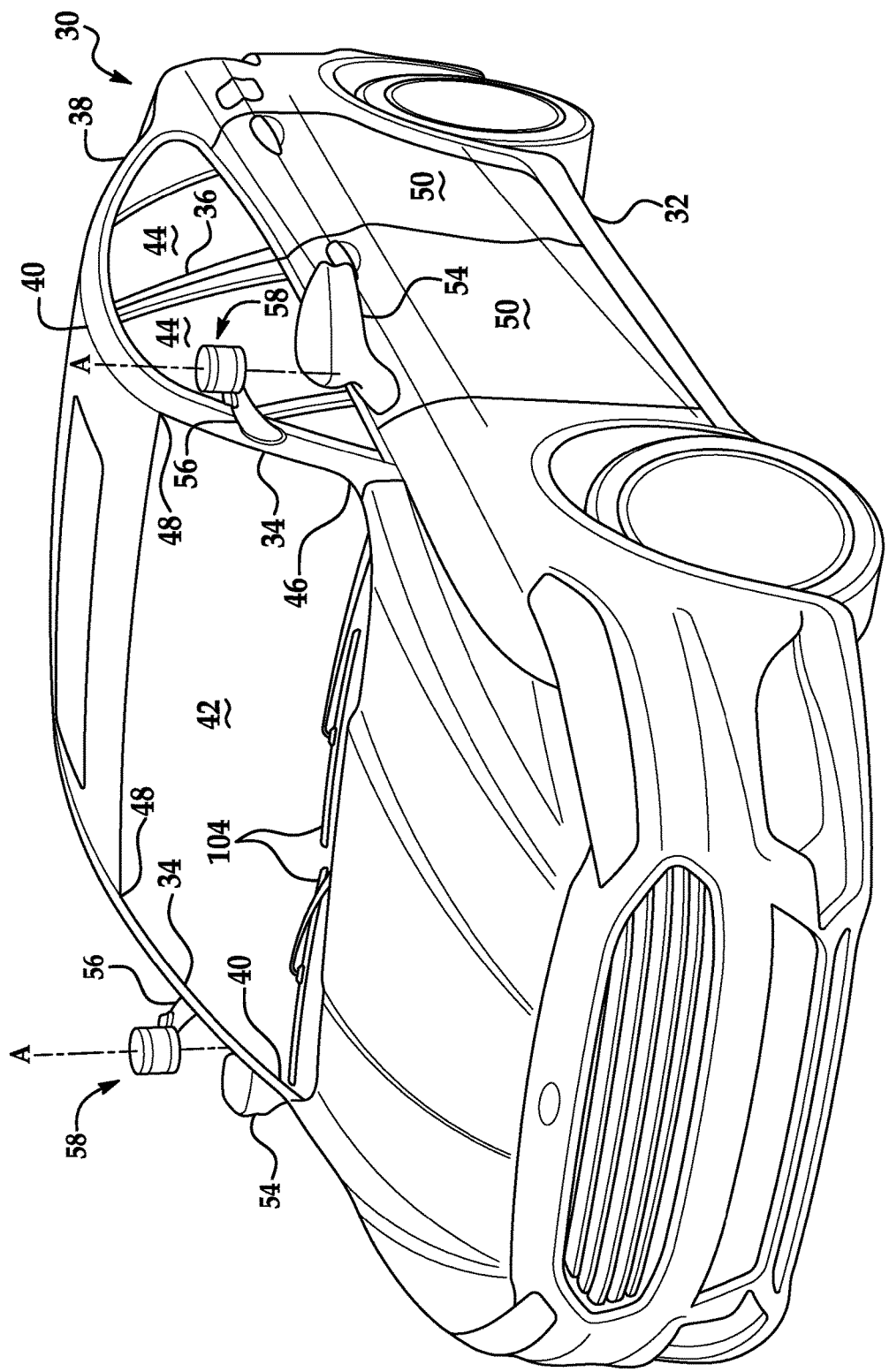
FIG. 1 is a perspective view of an example vehicle.

A sensor apparatus includes a housing, a LIDAR sensor attached to the housing, and a window releasably coupled to the housing.

The window may be cylindrical. The housing may be a first housing, and the sensor apparatus may include a second housing. The window may be releasably coupled to the second housing. In an example, the window may be compressed between the first housing and the second housing. The window may extend from a first end releasably coupled to the first housing to a second end releasably coupled to the second housing. The first end may include a first lip engageable with the first housing, and the second end may include a second lip engageable with the second housing. The second housing may be coupled to and movable relative to the first housing. The window may define an axis, and the second housing is adjustable along the axis relative to the first housing.

In another example, the window may extend from a first end releasably coupled to the first housing and a second end releasably coupled to the second housing. The first end may include a first thread engageable with the first housing, and the second end may include a second thread engageable with the second housing. The window may define an axis. The first thread may include a spiral shape about the axis at a constant first radius from the axis, and the second thread may include a spiral shape about the axis at a constant second radius from the axis.

The window may be cylindrical. The housing may be a first housing, and the sensor apparatus may include a second housing. The window may be releasably coupled to the second housing. One of the window and the first housing may include a tab, and the other of the window and the first housing may include a receiving clip. The tab may include a locked position engaged with the receiving clip and an unlocked position disengaged with the receiving clip. The tab may be a first tab, and the receiving clip may be a first receiving clip. One of the window and the second housing may include a second tab, and the other of the window and the second housing may include a second receiving clip. The second tab may include a locked position engaged with the second receiving clip and an unlocked position disengaged with the second receiving clip. The tabs each include a hook portion, and the receiving clips each include a catch. When the tabs are in the locked position, the hook portions may rest against the catches.

The window may be cylindrical. The housing may be a first housing, and the sensor apparatus may include a second housing. The window may be releasably coupled to the second housing. The first and second housings may be cylindrical. A diameter of the window may be substantially equal to a diameter of the first housing and to a diameter of the second housing.

The window may include a hydrophobic surface treatment.

The sensor apparatus may include a vehicle body, and the housing may be mounted to the vehicle body.

A vehicle includes a vehicle body, a housing mounted to the vehicle body, a LIDAR sensor attached to the housing, and a window releasably coupled to the housing.

The vehicle body may include an A pillar, and the sensor apparatus may include an arm extending from the A pillar to the housing. The window may be cylindrical. The housing may be a first housing, and the vehicle may include a second housing. The window may be releasably coupled to the second housing.

The sensor apparatus may be exposed to an external environment that may be harsh. For example, the sensor apparatus may experience hail, dust, impacts from road debris, extensive sun exposure, etc. The sensor apparatus allows for replacement of the window without needing to replace other components of the sensor apparatus. The other components of the sensor apparatus, such as the sensor itself, may be considerably more expensive than the window. Allowing easy replacement of the window may lower the cost of ownership of a vehicle incorporating the sensor apparatus.

Figure 2:
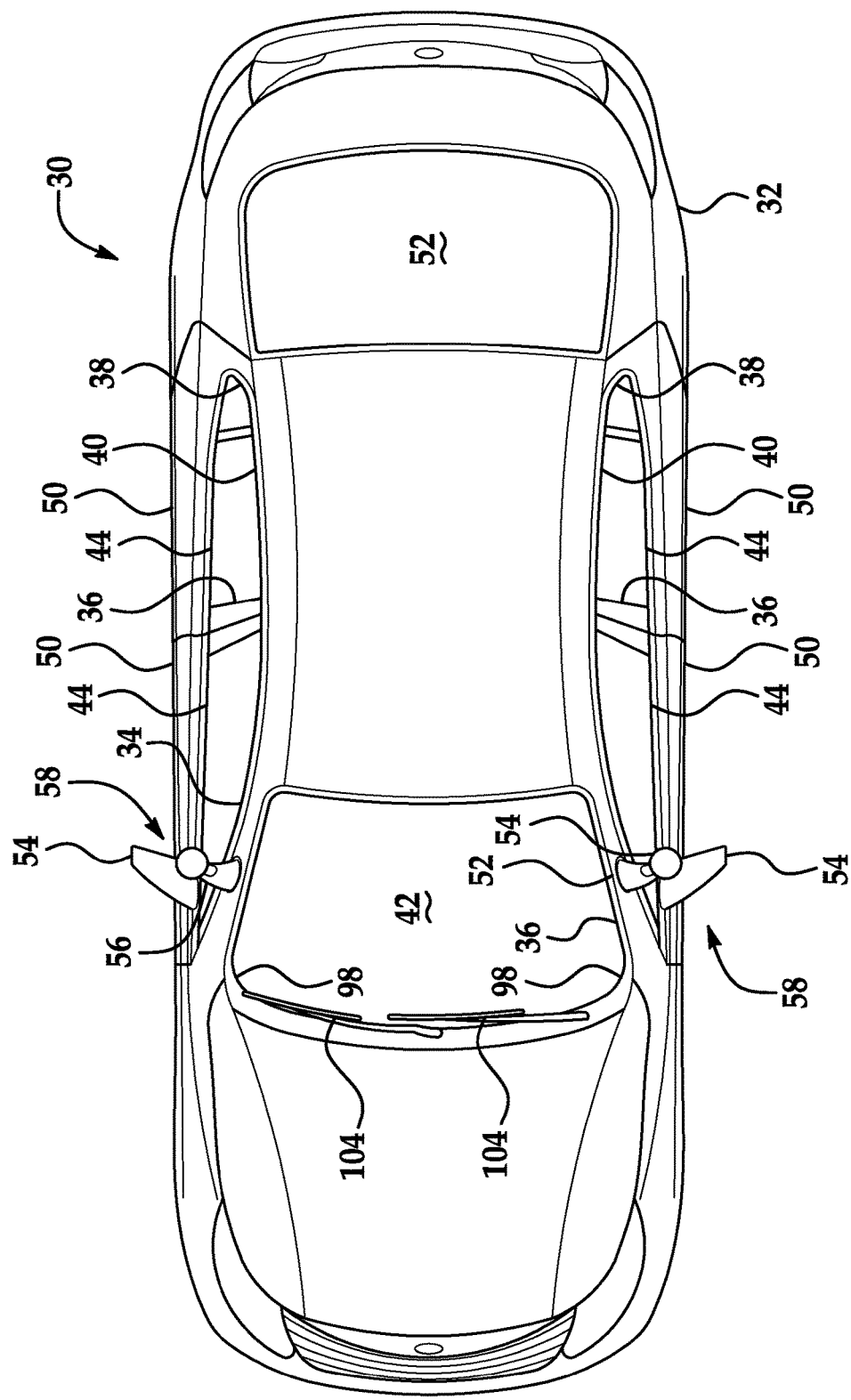
FIG. 2 is a top view of the vehicle.

With reference to FIGS. 1 and 2, a vehicle body 32 of a vehicle 30 may include A pillars 34, B pillars 36, C pillars 38, and roof rails 40. The A pillars 34 may extend between a windshield 42 and vehicle windows 44 and from a bottom end 46 at a bottom of the windshield 42 to a top end 48 at a top of the windshield 42. The B pillars 36 may extend between the vehicle windows 44 of adjacent doors 50. The C pillars 38 may extend between the vehicle windows 44 and a backlite 52. The vehicle body 32 may also include D pillars (not shown) if the vehicle 30 is, e.g., an SUV, crossover, minivan, or station wagon, in which case the C pillars 38 extend between the vehicle windows 44 of rear doors 50 and rear left and right vehicle windows 44, and the D pillars extend between the rear right and left vehicle windows 44 and the backlite 52. The roof rails 40 extend along the vehicle windows 44 from the A pillar 34 to the B pillar 36 to the C pillar 38.

The windshield 42 and vehicle windows 44 may be formed of any suitably durable transparent material, including glass such as laminated, tempered glass or plastic such as Plexiglas or polycarbonate. The windshield 42 is located adjacent the A pillars 34.

The vehicle 30 may include side-view mirrors 54. The side-view mirrors 54 may be located on the front doors 50 or on the vehicle body 32 near the bottom of the windshield 42. The side-view mirrors 54 may be visible to a human driver through the vehicle windows 44 and provide a reflected view from a vehicle-rearward direction to the driver.

With continued reference to FIGS. 1 and 2, an arm 56 extends from one of the pillars 34, 36, 38 of the vehicle 30, e.g., the A pillar 34, to a sensor assembly 58. The arm 56 may be located between the ends 46, 48 of the A pillar 34, that is, spaced from the bottom of the windshield 42 and from the top of the windshield 42, that is, spaced from the bottom end 46 and from the top end 48. The arm 56 may be attached to a bottom surface 62 of a first housing 60 of the sensor assembly 58. (The adjectives "first" and "second" are used throughout this document as identifiers and are not intended to signify importance or order.) The arm 56 may have a tubular or other hollow shape, that is, a cavity may extend through the arm 56. The cavity may allow wiring, tubes, etc. to pass through the arm 56 while being shielded from the outside environment.

With reference to FIG. 3, the sensor assembly 58 typically includes the first housing 60, a sensor 64, a window 66, and a second housing 68. The sensor assembly 58 may have a cylindrical shape with a top surface 70, the bottom surface 62, and a side surface 72. The top surface 70 faces up, that is, in a vehicle-upward direction, and the bottom surface 62 faces down, that is, in a vehicle-downward direction. The cylindrical shape of the sensor assembly 58 defines an axis A, which runs through a center of the sensor assembly 58. The axis A is oriented vertically relative to the vehicle 30. The side surface 72 faces radially away from the axis A. The side surface 72 includes a first side surface 74 on the first housing 60, an outer surface 76 of the window 66, and a second side surface 78 on the second housing 68.

With reference to FIGS. 1 and 2, the sensor assembly 58 is attached to or mounted to the vehicle body 32. For example, the arm 56 may extend from the vehicle body 32 and support the first housing 60. The side-view mirrors 54 may be located below the sensor assemblies 58, that is, in a vehicle-downward direction from the sensor assemblies 58, and each bottom surface 62 may face the corresponding side-view mirror 54.

With reference to FIGS. 3, 4, 6, and 7, the first housing 60 may include the bottom surface 62 and the first side surface 74. The first housing 60 may be cylindrical; for example, the bottom surface 62 may be flat and circular, and the first side surface 74 may extend perpendicular to the bottom surface 62 from a circumference of the bottom surface 62. The first housing 60 may support the sensor 64.

The sensor 64 is attached to the first housing 60. The sensor 64 may be designed to detect features of the outside world; for example, the sensor 64 may be a radar sensor, a scanning laser range finder, a light detection and ranging (LIDAR) device, or an image processing sensor such as a camera. In particular, the sensor 64 may be a LIDAR sensor. A LIDAR sensor detects distances to objects by emitting laser pulses and measuring the time of flight for the pulse to travel to the object and back. The laser pulses may have a wavelength of approximately 905 nanometers.

The window 66 may be cylindrical and may define the axis A. The window 66 extends about the axis A. The window 66 may extend fully about the axis A, that is, 360°, or partially about the axis A. The window 66 extends along the axis A from a first end 80 to a second end 82. The first end 80 may touch the bottom surface 62 or may be spaced from the bottom surface 62 and touch the first side surface 74. The second end 82 may touch the top surface 70 or may be spaced from the top surface 70 and touch the second side surface 78. The window 66 has a diameter. The diameter of the window 66 may be substantially equal to a diameter of the first housing 60 and/or to a diameter of the second housing 68; in other words, the window 66 may be flush or substantially flush with the side surface 72. "Substantially equal" and "substantially flush" mean the diameter of the window 66 is within 5% of the diameter of the first housing 60 or of the second housing 68.

At least some of the window 66 is transparent with respect to whatever phenomenon the sensor 64 is capable of detecting, e.g., infrared radiation, visible light, etc. For example, if the sensor 64 is a LIDAR sensor, then the window 66 is transparent with respect to light having a wavelength of approximately 905 nanometers. The window 66 may be formed of, e.g., glass such as laminated, tempered glass or plastic such as polycarbonate or acrylic.

The window 66 may include a surface treatment on the outer surface 76. The surface treatment may be a hydrophobic coating, i.e., a coating repellent to water. The surface treatment may be an omniphobic coating, i.e., a coating repellent to water and to oily liquids. The surface treatment may be a superhydrophilic coating, i.e., a coating attractive to water such that a contact angle of water on the treated surface is less than 10°.

With continued reference to FIGS. 3, 4, 6, and 7, the second housing 68 may include the top surface 70 and the second side surface 78. The second housing 68 may be cylindrical; for example, the top surface 70 may be flat and circular, and the second side surface 78 may extend perpendicular to the top surface 70 from a circumference of the top surface 70.

The window 66 is releasably coupled to the first housing 60 and releasably coupled to the second housing 68. The first end 80 may be releasably coupled to the first housing 60, and the second end 82 may be releasably coupled to the second housing 68. "Releasably coupled" means that two components are mechanically attached, that is, attached without adhesives, in a manner whereby the attachment is reversible, that is, in a manner that an operator can undo the attachment without damaging the components.

With reference to FIGS. 4 and 5, for a first example of the sensor assembly 58, the window 66 is releasably coupled to the first and second housings 60, 68 by being compressed between the first and second housings 60, 68.

The second housing 68 is coupled to and movable relative to the first housing 60. For example, one or a plurality of bolts 84 may feed through corresponding bolt holes 86 in the second housing 68 and thread into threaded holes 88 in the first housing 60. Tightening the bolts 84 pushes the first and second housings 60, 68 toward each other, and loosening the bolts 84 moves the housings 60, 68 away from each other. The bolts 84 may be oriented parallel to the axis A, and the second housing 68 may be adjustable along the axis A relative to the first housing 60.

The window 66 may be compressed between the first and second housings 60, 68. "Compressed" means that the first and second housings 60, 68 exert opposing compressive (i.e., toward each other) forces on the ends 80, 82 of the window 66. When the first and second housings 60, 68 are in contact with the window 66, tightening the bolts 84 increases the compressive force exerted on the window 66.

With reference to FIG. 5, alternatively or additionally to compressing the window 66, the first end 80 may include a first lip 90 engageable with the first housing 60, and the second end 82 may include a second lip 92 engageable with the second housing 68. The lips 90, 92 may extend about a circumference of the respective ends 80, 82. The housings 60, 68 may include first and second housing lips 94, 96 engageable with the lips 90, 92. The first housing lip 94 may have an outer diameter substantially equal to an inner diameter of the first lip 90, or vice versa. The second housing lip 96 may have an outer diameter substantially equal an inner diameter of the second lip 92, or vice versa. "Substantially equal" means, when engaged, the window 66 does not noticeably move orthogonal to the axis A relative to the first or second housing 60, 68.

Figures 6, 7:
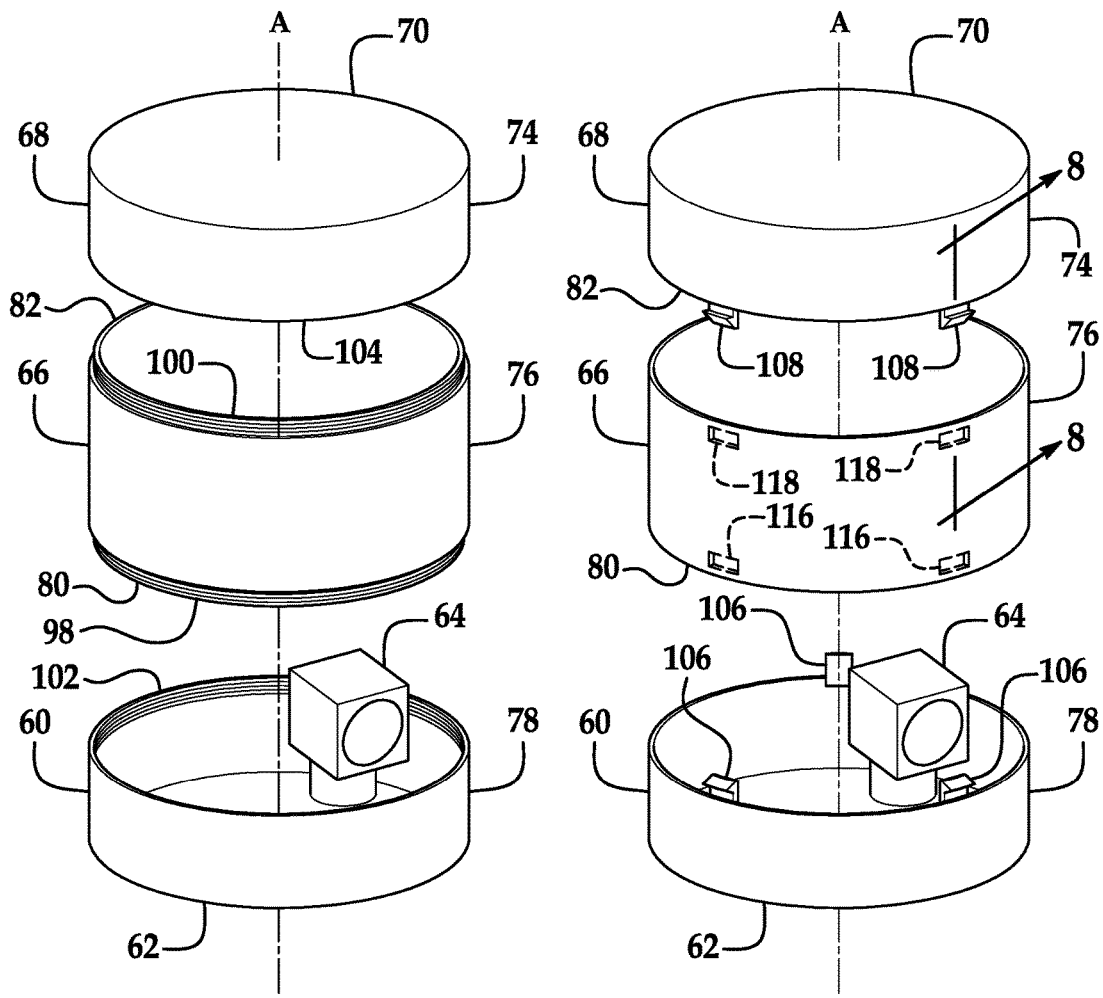
FIG. 6 is an exploded view of second example of the sensor apparatus.
FIG. 7 is an exploded view of a third example of the sensor apparatus.

With reference to FIG. 6, for a second example of the sensor assembly 58, the window 66 is releasably coupled to the first and second housings 60, 68 by being threadedly engaged with the first and second housings 60, 68.

The first end 80 of the window 66 in this example includes a first thread 98 engageable with the first housing 60, and the second end 82 of the window 66 may include a second thread 100 engageable with the second housing 68. The first thread 98 may include a spiral shape about the axis A at a constant first radius from the axis A, and the second thread 100 may include a spiral shape about the axis A at a constant second radius from the axis A. The first and second radii may be the same, as shown in FIG. 6. The first housing 60 includes a first matching thread 102, and the second housing 68 may include a second matching thread 104. The first thread 98 may be mateable with the first matching thread 102, and the second thread 100 may be mateable with the second matching thread 104. Rotating the window 66 with respect to the first housing 60, or vice versa, may draw the window 66 and first housing 60 together or apart according to the spiral shape of the first thread 98 and the direction of rotation. Rotating the window 66 with respect to the second housing 68, or vice versa, may draw the window 66 and second housing 68 together or apart according to the spiral shape of the second thread 100 and the direction of rotation. The first and second ends 80, 82 of the window 66 may be symmetrical; that is, the window 66 may have the same shape when turned around relative to the axis A.

Figure 8:
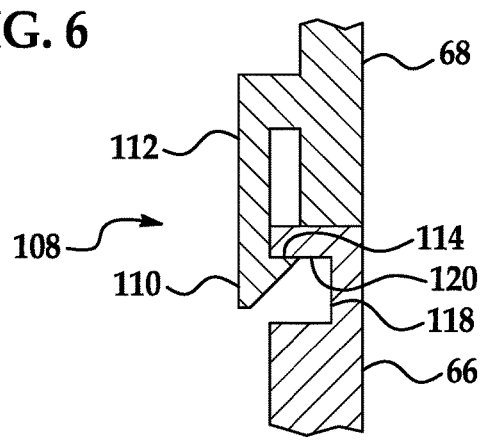
FIG. 8 is a cross-sectional view of a portion of the third example of the sensor apparatus.

With reference to FIGS. 7 and 8, for a third example of the sensor assembly 58, the window 66 is releasably coupled to the first and second housings 60, 68 via tabs 106, 108.

One of the window 66 and the first housing 60 includes a first tab 106, and one of the window 66 and the second housing 68 includes a tab. For example, the first housing 60 may include the first tab 106, and the second housing 68 may include the second tab 108, as shown in FIG. 7. There may be a plurality of first tabs 106 and/or a plurality of second tabs 108. The tabs 106, 108 each include a hook portion 110 and an extended portion 112. The extended portion 112 extends from the respective housing toward the window 66, or vice versa. The extended portion 112 may be flexible, that is, able to bend sufficiently for the hook portion 110 to lock (as explained below) elastically, that is, without experiencing plastic deformation. The hook portion 110 may extend transverse to the extended portion 112. The hook portion 110 may include a hook face 114 that extends perpendicular or at an acute angle relative to the extended portion 112 or relative to the axis A.

The other of the window 66 and the first housing 60 includes a first receiving clip 116, and the other of the window 66 and the second housing 68 includes a second receiving clip 118. The receiving clips 116, 118 each include a catch 120, which is a surface positioned to engage the hook face 114 when the tab is locked. The catch 120 may extend into or from the window 66 or respective housing 60, 68. The catch 120 may extend perpendicular or transverse to the axis A.

The first and second tabs 106, 108 may each be in a locked position engaged with the receiving clip or may be in an unlocked position disengaged with the receiving clip. When the tabs 106, 108 are in the locked positions, the hook portions 110 rest against the catches 120; specifically, the hook faces 114 rest against the catches 120. When the tabs 106, 108 are moved from the unlocked position to the locked position, the window 66 may be moved toward the first or second housing 68, the extended portions 112 bend while the hook portions 110 move past the catches 120, and then the extended portions 112 snap the hook portions 110 into the locked positions once the hook portions 110 pass the catches 120. The hook faces 114 resting against the catches 120 prevent the window 66 and the housings 60, 68 from moving apart unless an operator bends the extended portions 112.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor apparatus comprising:
    a first housing;
    a second housing spaced from the first housing;
    a LIDAR sensor attached to the first housing; and
    a cylindrical window releasably coupled to the first housing and to the second housing, wherein the window extends from a first end releasably coupled to the first housing to a second end releasably coupled to the second housing, the first end including a first thread engageable with the first housing, and the second end including a second thread engageable with the second housing.

2. The sensor apparatus of claim 1, wherein the window is compressed between the first housing and the second housing.

3. The sensor apparatus of claim 2, wherein the window extends from a first end releasably coupled to the first housing to a second end releasably coupled to the second housing, the first end including a first lip engageable with the first housing, and the second end including a second lip engageable with the second housing.

4. The sensor apparatus of claim 2, wherein the second housing is coupled to and movable relative to the first housing.

5. The sensor apparatus of claim 4, wherein the window defines an axis, and the second housing is adjustable along the axis relative to the first housing.

6. The sensor apparatus of claim 1, wherein the window defines an axis, the first thread including a spiral shape about the axis at a constant first radius from the axis, and the second thread including a spiral shape about the axis at a constant second radius from the axis.

7. The sensor apparatus of claim 1, wherein one of the window and the first housing includes a tab and the other of the window and the first housing includes a receiving clip, and the tab includes a locked position engaged with the receiving clip and an unlocked position disengaged with the receiving clip.

8. The sensor apparatus of claim 7, wherein the tab is a first tab and the receiving clip is a first receiving clip, and one of the window and the second housing includes a second tab and the other of the window and the second housing includes a second receiving clip, and the second tab includes a locked position engaged with the second receiving clip and an unlocked position disengaged with the second receiving clip.

9. The sensor apparatus of claim 8, wherein the tabs each include a hook portion, and the receiving clips each include a catch, and when the tabs are in the locked positions, the hook portions rest against the catches.

10. The sensor apparatus of claim 1, wherein the first and second housings are cylindrical.

11. The sensor apparatus of claim 10, wherein a diameter of the window is substantially equal to a diameter of the first housing and to a diameter of the second housing.

12. The sensor apparatus of claim 1, wherein the window includes a hydrophobic surface treatment.

13. The sensor apparatus of claim 1, further comprising a vehicle body, wherein the first housing is mounted to the vehicle body.

14. A sensor apparatus comprising:
a first housing;
a second housing spaced from the first housing;
a LIDAR sensor attached to the first housing; and
a cylindrical window releasably coupled to the first housing and to the second housing, wherein one of the window and the first housing includes a tab and the other of the window and the first housing includes a receiving clip, and the tab includes a locked position engaged with the receiving clip and an unlocked position disengaged with the receiving clip.

15. The sensor apparatus of claim 14, wherein the first and second housings are cylindrical.

16. The sensor apparatus of claim 15, wherein a diameter of the window is substantially equal to a diameter of the first housing and to a diameter of the second housing.

17. The sensor apparatus of claim 14, wherein the window includes a hydrophobic surface treatment.

18. The sensor apparatus of claim 14, further comprising a vehicle body, wherein the first housing is mounted to the vehicle body.

19. A sensor apparatus comprising:
a first housing;
a second housing spaced from the first housing;
a LIDAR sensor attached to the first housing; and
a cylindrical window releasably coupled to the first housing and to the second housing;
wherein the window is compressed between the first housing and the second housing; and
the window extends from a first end releasably coupled to the first housing to a second end releasably coupled to the second housing, the first end including a first lip engageable with the first housing, and the second end including a second lip engageable with the second housing.

20. The sensor apparatus of claim 19, wherein the first and second housings are cylindrical, and a diameter of the window is substantially equal to a diameter of the first housing and to a diameter of the second housing.

* * * * *